Jan. 29, 1935. W. K. PORTER 1,989,460
ANIMATED FISH LURE
Filed May 9, 1933 2 Sheets-Sheet 1
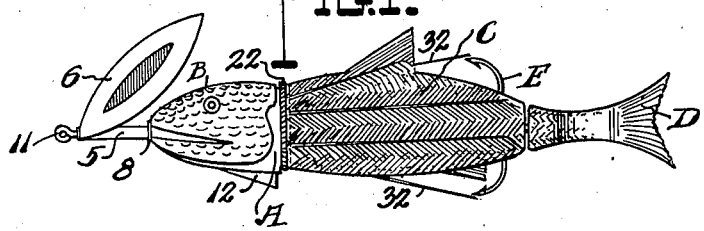
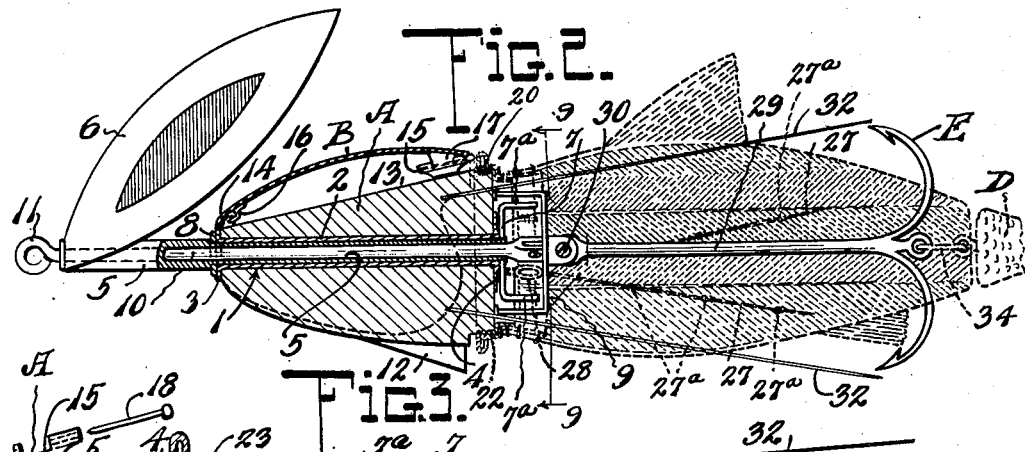
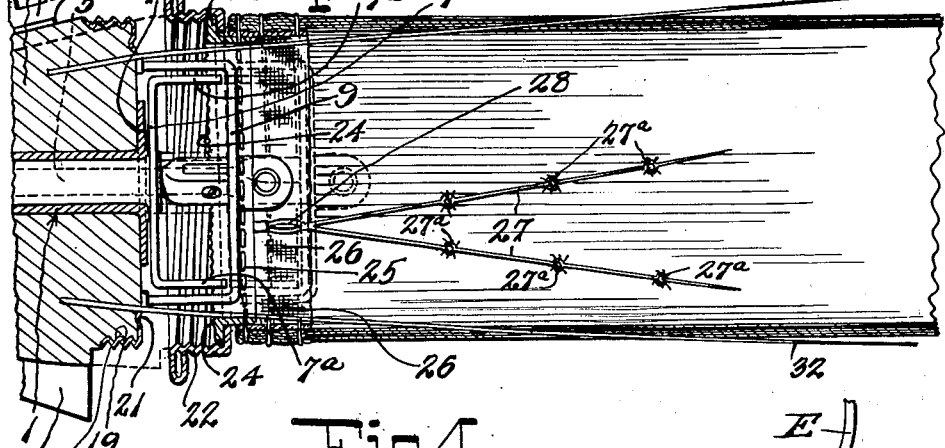
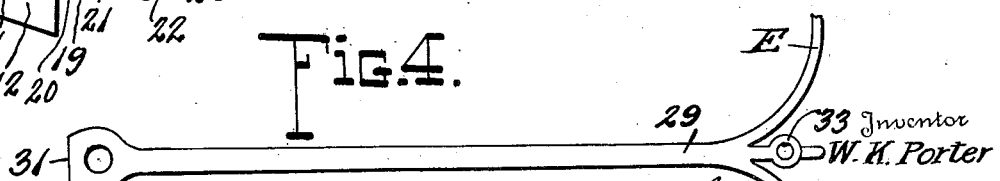
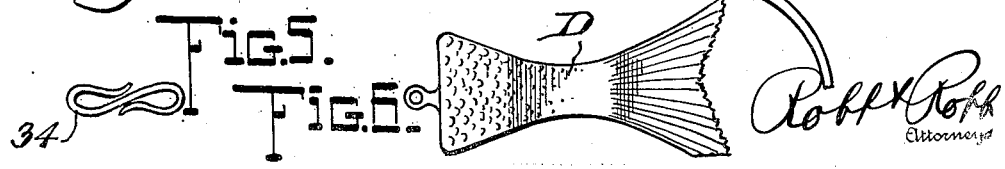
Inventor
W. K. Porter Jan. 29, 1935. W. K. PORTER 1,989,460
ANIMATED FISH LURE
Filed May 9, 1933 2 Sheets-Sheet 2
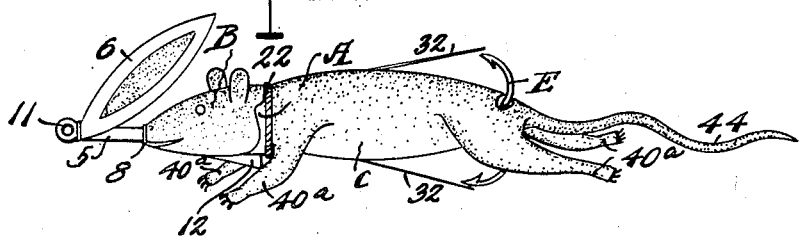
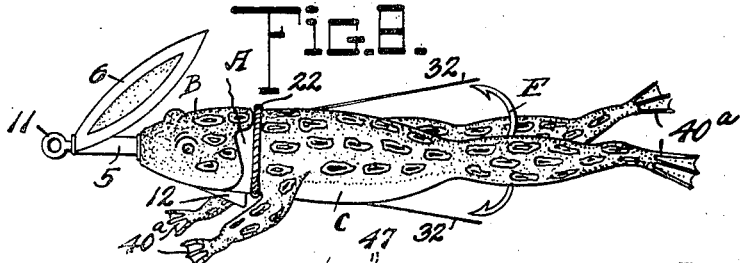
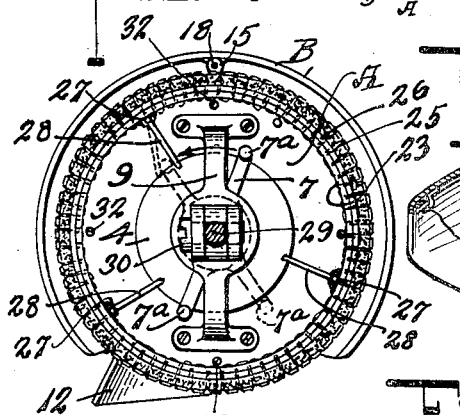
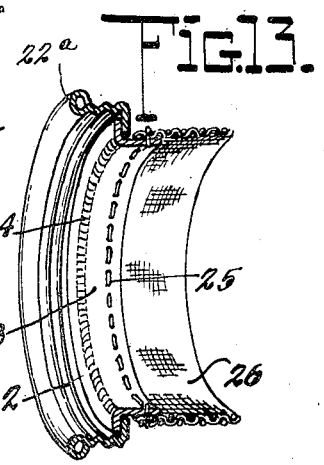
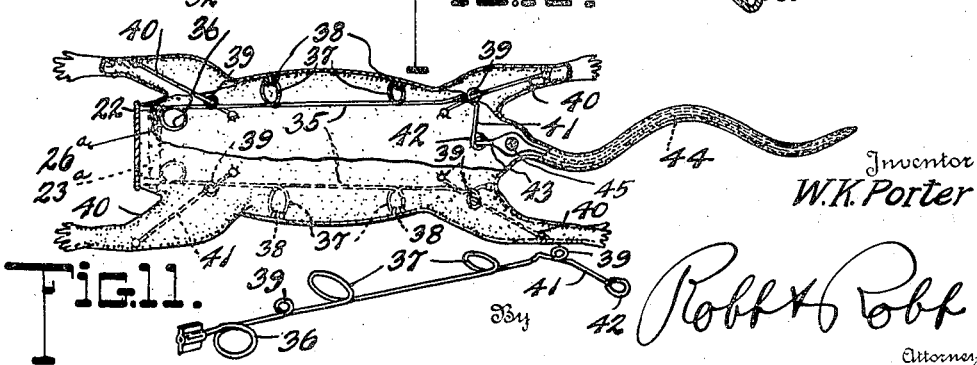
Inventor
W. K. Porter Patented Jan. 29, 1935

1,989,460

UNITED STATES PATENT OFFICE 1,989,460

ANIMATED FISH LURE

William K. Porter, Pittsburgh, Pa.

Application May 9, 1933, Serial No. 670,147

12 Claims. (Cl. 43—42)

This invention relates to artificial fish baits and more particularly to animated fish lures for game fish such as bass, trout, salmon, muskellunge, and so forth.

These game fish are frequently found around weed beds, sunken logs, submerged snags, etc., where they are constantly in search of food consisting of flies and bugs which fall on the water, and also frogs, crawfish, minnows and the like. These small insects, animals and fish, in order to tempt the fish must be alive.

There are many different kinds of artificial bait on the market and in use today, such as flies, buck-tails, spoons, wooden plugs, etc., which bait after being cast and retrieved wobble or return in a zig-zag manner but the bait itself does not seem to possess any life or animation, also the large treble or gang hooks generally used with this type of bait are clearly visible to the fish which under most circumstances totally disregard the bait offered.

These exposed and unprotected hooks become entangled and snagged in the under-water obstructions referred to causing much annoyance and oftentimes loss of the bait. Game fish in different localities apparently require entirely different kinds and types of bait, also different kinds of game fish require various kinds of lures in order to tempt them to strike. With the use of the lures found on the market today the fisherman must, in order to be prepared for the above conditions, carry in his kit a rather large assortment of different kinds of fish lures and bait.

It is therefore an object of this invention to provide a fish lure which will eliminate to a very large degree the above noted objections and disadvantages by providing an artificial animated bait that is weedless and may be cast among sunken logs, snags and so forth with little or no danger of the hooks being caught in these obstructions. Also, the bait when retrieved will show animation of its body, legs and arms or wings, and may be easily and quickly changed to different types and colors while at the same time retaining its animated characteristics.

A further object of the invention is to provide an animated bait having an operating mechanism for causing independent movements of its several parts when drawn or retrieved through water.

A still further object is the provision of an animated bait having a partly concealed hook or hooks and associated weed guards to prevent entanglement of the bait with under-water obstructions.

Another object of my invention is the provision of an animated artificial bait having removable head and body portions whereby various types and colors of insects, small animals, minnows and such may be simulated by adding other head and body portions to the bait.

With these and other objects in view, the invention consists in the novel combination and arrangement of parts which will be fully set forth in the following specification and accompanying drawings in which:

Fig. 1 is a side elevation of my improved animated bait disclosing the feathered minnow body in position thereon;

Fig. 2 is an enlarged vertical longitudinal sectional view through the construction shown in Fig. 1, the spinner and a portion of the spinner sleeve being shown in elevation; also the removable feathered body portion being shown in dotted lines;

Fig. 3 is a further enlarged fragmentary sectional view of the rear portion of the main supporting body of the bait, the head shell being removed and a different type of body such as a "buck-tail" in position to be secured onto the main supporting body; dotted lines disclosing the main body portion and the removable rear body in assembled position;

Fig. 4 is a fragmentary detail view of the hook member as seen in Fig. 2;

Fig. 5 is a detail view of the double hook for attaching the tail portion to the hook member;

Fig. 6 is a detail elevation of the tail portion;

Fig. 7 is a view of my improved animated bait disclosing another type of head and body portion in position, and depicting a field mouse;

Fig. 8 is a view showing still another form of head and rear body portion in position and depicting a frog;

Fig. 9 is a vertical sectional view taken approximately on the line 9—9 of Fig. 2;

Fig. 10 is a plan view partly broken away of the removable body portion shown in Fig. 7 and disclosing the actuating means for the legs and tail;

Fig. 11 is a detail perspective view of one of the actuating rods;

Fig. 12 is a detail vertical sectional view through one of the removable head shells;

Fig. 13 is an enlarged vertical longitudinal sectional view in perspective of a portion of one of the securing means for a rear body member; and Fig. 14 is an elevation of another form of body simulating a flying insect.

Like reference characters designate corresponding parts in the several figures of the drawings, in which A denotes a main supporting body generally which carries a removable thin metallic head shell B and a removable rear body portion or member C which in Fig. 1 of the drawings is of the minnow type and is composed of a plurality of multicolored feathers. The main supporting body portion carries hooks E which are partially concealed by the rear body portion. With the type of bait disclosed in Fig. 1 a tail portion D is pivoted or otherwise secured to the hooks as seen in Fig. 2.

The main supporting body portion A is formed of any suitable buoyant material such as cork, cedar and the like and has sufficient buoyancy to allow the bait when completely assembled to sink very slowly in the water. The supporting body is provided with a longitudinal bore 1 lined with a metallic sleeve 2 which may be flanged at its front and rear extremities to prevent longitudinal displacement thereof within the body or washers 3 and 4 and may be soldered or otherwise secured to the sleeve 1 against the front and rear faces of the supporting body. Journalled within the sleeve 1 is a spinner actuated sleeve or hollow shaft 5 which has secured to the front end thereof a spinner blade 6. This blade is set at an angle to a transverse plane passing through the body A in order to provide sufficient pitch that the water passing the device as it is retrieved will cause the spinner to revolve and thereby rotate the spinner sleeve or shaft 5. The rear end of the sleeve or hollow shaft 5 has secured thereto a forked arm actuator 7 having one or more rearwardly extending striker arms 7a for a purpose later to be explained. The sleeve 5 is prevented from moving forwardly within the sleeve 2 by the transverse portion of the actuator 7, and rearward shifting movement is prevented by a washer or collar 8 which is soldered or otherwise fixed to the shaft adjacent the forward portion of the main supporting body A. The rear face of the main body A has secured thereto the U-shaped stabilizer plate or bracket 9 (see Figs. 2, 3 and 4) having a centrally disposed squared hole in which is positioned the squared end of the extension or retrieving line attaching shaft 10. This shaft extends through the interior of the spinner sleeve 5 and terminates in a ring or eye 11 to which may be attached the usual gut leader or line, not shown, for casting and retrieving the bait. The lower surface of the main body has obliquely secured thereto the metallic fin or clip 12 for causing the bait to move through the water in an erratic course as it is being retrieved.

The upper portion of the supporting body is flattened as at 13 and carries at its forward end a socket 14. Secured adjacent the rear upper portion of the surface 13 is a bifurcated bracket 15. The removable metallic shell head B has a projection 16 which extends into the socket 14. The shell B also carries adjacent its central rear portion a bracket 17 adapted to be disposed intermediate the bifurcated arms of the bracket 15. This shell head B extends around the supporting body portion A in slightly spaced relation and is rockably carried by the socket 14 and the bracket 15 as clearly disclosed in Fig. 2 of the drawings, the brackets 15 and 17 having a longitudinal bore therethrough to receive the retaining pin 18.

By referring to Figs. 1, 7 and 8 it will be observed that these shell head members comprise representations of the heads of different types of bait and may be interchanged as desired by removing the pin 18, lifting the rear of the head after which the projection 16 may be withdrawn from the socket 14 and a new or different head then placed in position on the supporting body A. As the bait is drawn through the water the fin 12 causes the same to take an erratic course which action causes the lateral water pressure against the metallic head shell B to rock the same giving a very animated appearance to the forward portion of the bait. The rear portion of the main supporting body is threaded as indicated at 19 and provided with a flanged ferrule or threaded liner 20 corrugated at 21 and adapted to receive the threaded collars 22 carrying the various forms and types of the rear portions of the baits or lures to be depicted.

Referring particularly to Fig. 3 in which a buck-tail type of bait is shown a flanged sleeve 23 is carried within the threaded collar 22 and has formed thereon corrugations 24 adapted to register with the corrugations 21 on the threaded ferrule when the bait is fully assembled. The flanged sleeve 23 is provided with apertures 25 for receiving the stitching or securing means to position the canvas or flexible band 26 thereon. The body section of the rear portion of the bait may be also secured by the stitching just referred to or this body may be otherwise suitably secured to the band 26. Suitably and movably positioned on the band 26 are a plurality of rearwardly extending body actuating rods 27 which are provided with laterally disposed striker loops 28 arranged to be positioned in the path of movement of the rearwardly extending arms 7a of the forked arm actuator 7 when the device is assembled. These actuating rods 27 may be provided with eyes 27a as shown in Fig. 3 for suitably securing portions of the rear body thereto. The fish impaling means may preferably be a treble or gang hook 29 as disclosed in Figs. 2 and 4 which is removably secured to the rear face of the stabilizer plate or bracket 9 as indicated at 30 by a screw or other suitable retaining means. The forward portion of the shank of the hook is flattened to rest against the stabilizer plate 9 and thus maintain the hook in substantially rigid position with respect to the supporting body A. Weed guards 32 consisting of resilient wires suitably rust-proofed are inserted in the supporting body portion and extend rearwardly to points adjacent the barbed ends of the hooks to protect them against snagging when the lure is cast among under-water obstructions.

The rear portion of the shank of the treble hook 29 is provided with an eye 33 for connecting the tail portion D thereto. This connection may be made in any suitable manner such as by the double looped hook 34 as seen in Fig. 5.

With reference to the type of bait shown in Figs. 1 to 6 of the drawing it should be observed that after the bait has been cast and is being retrieved the water passing the bait will cause the spinner 6 to rotate, thereby effecting a rotation of the forked arm actuator 7. The arms 7a on this actuator will strike the laterally disposed striker loops 28 forming a part of the body actuating rods 27 and thereby cause these rods to be twisted so to speak effecting independent movements of the rear body of the bait. Since these rods are stitched or otherwise secured to the feathers as indicated in Figs. 1 and 2 or to the hair of the buck-tail bait as indicated in Fig. 3 the rear body portion of the bait will appear life-like.

As previously pointed out the fin 12 will cause the bait to move in a more or less erratic manner through the water and this movement will effect a rocking or oscillation of the head shell member B thus rendering the forward portion of the bait very life-like.

When a rear body portion is used representing the type of bait indicated in Figs. 7 and 8 and 10 the body actuating rods 27 are of slightly different form than those disclosed in Figs. 2 and 3. These actuating rods are indicated generally at 35 and are movably secured to the flexible band 26a carried by the flanged sleeve 23a which sleeve is in turn carried by the threaded collar 22 as seen more particularly in Fig. 13. The body actuator rods 35 are provided with striker loops 36 similar to the rods 27 previously described. The rods 35, however, extend rearwardly and are provided with additional loops 37 which are secured to the body at points 38. The rods are also provided with smaller loops 39 through which pass rods 40 extending into the legs of the bait and suitably secured thereto. The rear free end of one of the rods 35 may be bent laterally as at 41 and looped as indicated at 42 to receive the operating end 43 of the tail actuating rod 44. This tail actuating rod may be suitably pivoted to the body by stitching or other means as indicated at 45.

When this type of bait is used, it should be observed that rotation of the forked arm actuator 7 will twist the rods 35 causing actuation of the legs and tail of the animal represented by the bait and thereby produce a very effective animated fish lure.

Referring now to Fig. 14 of the drawings this type of bait is used more especially for smaller fish such as bass and trout and is also provided with movable wings 46 which are actuated by the acuator rods 47 in a manner similar to the other baits previously described in detail.

As previously pointed out, it is not necessary for the person using my improved fish lure to provide a large number of different kinds and shapes of bait in order to be properly equipped to meet various fishing conditions, but the fisherman need only provide himself with one of the main supporting body portions A, carrying the operating mechanism, and as many different kinds and types of interchangeable head and body members representing minnows, frogs, mice, etc., as he desires and thus at minimum expense have available a fish lure of the animated type in which the head and body members may be easily and quickly interchanged to suit the various kinds of fishing conditions, as stated.

In changing the body and head members of the bait or lure, for instance from the "feather minnow" type as shown in Figs. 1 and 2, or the "buck-tail" type as seen in Fig. 3, to the mouse or frog type as seen in Figs. 7 or 8, the rim of the threaded collar 22 is grasped and rotated to unscrew the same from the threaded portion of the supporting body portion A. The rear body member C may then be removed.

If, however, it becomes necessary to first remove the hook member E in order to free the body portion C, the screw fastening 30 for the hook is rendered accessible by first partially slipping the body C rearwardly with respect to the supporting body A. The screw fastening 30 may then be removed, after which the rear body member C and hook E may be removed.

The flange or head 22a of the threaded collar 22 when in operative position on the supporting body is disposed in the path of removal of the pin 18 constituting one of the rocking pivots for the head shell member B. After the collar 22 has been unscrewed and the rear body member C partially removed, this pin 18 becomes accessible and may be quickly and easily withdrawn. The rear portion of the head shell member may be raised and the shell then removed from the supporting body A as will be readily apparent from the drawings.

Another head shell B of the mouse or frog design may be quickly and easily positioned on the supporting body A and secured thereon by the replacement of the pin 18. The corresponding rear body member C is placed in position on the supporting body A and the sleeve 22 tightly screwed onto the threaded extremity of the supporting body.

The corrugations 24 on the flanged rear body carrying collar 23 interlock with the corrugations 21 carried by the supporting body A to prevent relative shifting of the rear body member C with respect to the supporting member A during its use.

In using my animated fish lure, it may be cast in the usual manner, and due to its slight lack of sufficient buoyancy to float, will sink very slowly if it is not immediately retrieved. The fisherman may thus make a cast and allow the lure to sink to any desired level before retrieving. Upon being retrieved the water will rotate the spinner blade causing the legs and other parts of the body to move in a most life-like manner.

The head shell member being balanced on the brackets 15—17, the socket and projection 14—16 rock or oscillate gently during the retrieving of the lure.

I claim:

1. An artificial bait comprising a main supporting body portion, a head member removably carried thereby in enclosing relation and arranged for free lateral oscillatory movement thereon and denoting the head of the bait to be represented, means for causing the bait to move in an erratic course when drawn through the water, a body removably carried by the body portion directly behind the head member denoting the body of the bait to be represented, and fish snaring means associated with the body portion aforesaid.

2. In an artificial bait, a main buoyant body portion, a head member movably carried thereby and arranged for lateral ocillation thereon, a fin member obliquely projecting from the lower surface of the body portion to cause the bait to move in an erratic course when drawn through the water, a body member carried by the buoyant body portion, means for causing independent movement of a portion of the body, and fish snaring means associated with the body.

3. In an animated fish bait of the class described, a buoyant body portion denoting the head of the bait to be represented, a body carried by the body portion having movable parts and denoting the body of the bait to be represented, a spinner shaft extending through the body and having a spinner blade secured to the forward portion thereof for rotating the shaft as the bait is drawn through the water, an actuating crank secured to the rear portion of said shaft, means for actuating the movable parts of the body from said crank as the crank is rotated, and fish impaling means associated with the body portion and extending through the body.

4. In an animated artificial bait of the class described, a main buoyant body portion, a spaced laterally oscillatable head pivoted to the upper portion of the body portion, an enclosing relatively movable body carried by the body portion, means for causing animated movement of said head and said body as the bait is moved through the water, and fish snaring means associated with the said body.

5. In an artificial bait of the animated type, a supporting body portion, a thin metallic shell head partially surrounding the body portion and pivotally carried thereby to rock laterally, a sleeve shaft extending longitudinally through the body portion, an operating spinner blade secured to the forward portion of the sleeve shaft and an actuating crank fixed to the rear portion of the sleeve shaft, a retrieving line attaching shaft extending interiorly through the sleeve shaft having a line attaching means at its forward end and secured to the body portion at its rear end, a rear body member extending rearwardly from the supporting body portion and finished to denote the body of the bait being represented, said body comprising movable parts, means to actuate said parts of the body from said crank, fish snaring means extending rearwardly from the body portion and terminating in projecting fish hooks, and weed guards for said hooks.

6. In an artificial bait of the animated class, a main body portion, a head shell rockably carried thereby, said body portion having a rearwardly extending threaded portion, a threaded collar arranged to be screwed on said extension, a band of flexible material carried by the collar, a flexible fish bait body secured to said flexible band, body actuating members secured to the band and extending rearwardly into and secured to said body, and mechanical means to actuate said actuating members to cause actuation of portions of the body.

7. In an artificial bait, a main body portion having sufficient buoyancy to permit the bait to sink very slowly when placed in water, head and body members removably attachable to the body portion for relative independent movements thereon and denoting the head and body portions of different kinds of fish bait, and fish snaring means projecting rearwardly of the body portion and partially concealed by the body member when in position on the body portion.

8. In an animated artificial bait, a main supporting body portion, movable head and body members removably carried by the supporting body portion in enclosing relation to denote the head and body of the fish lure represented, said head and body members having relative independent movements with respect to each other and with the supporting body portion, and fluid operated means for causing said relative independent movement of the head and the body members as the bait is drawn through a fluid.

9. In an artificial bait of the class described, a buoyant supporting body portion, a metallic shell partially surrounding the body portion in spaced relation and pivoted longitudinally of the body portion to rock laterally thereof, a rear body member removably carried by the supporting body portion, a fish hook member extending rearwardly of the body portion and partially concealed by the body member, and a tail portion forming a continuation of the body member movably secured to the fish hook member.

10. In an animated artificial fish bait a buoyant body having a longitudinal bore therethrough, a thin metallic shell removably pivoted to the upper part of the body portion and partially enclosing the body portion, said shell denoting the head of the bait to be represented and adapted to be rocked laterally of the body portion by the water in which the bait is used when the bait is moved laterally in the water, oblique fin means carried by the lower part of the body portion for directing the bait in an erratic course through the water as it is retrieved when in use, a rear body member removably carried by the body portion and having independently movable parts, an actuating member extending through the bore of the body portion, an actuating spinner fixed on the forward portion of the actuating member for rotating the same by the water when the bait is cast and retrieved, a line attaching member extending through the actuating member, a bracket secured to the rear face of the body portion and the rear end of the line attaching member, fish impaling means carried by said bracket and extending rearwardly through the body member, actuating means carried by the rear portion of the actuating member and means to actuate the independently movable parts of the rear body member from the last mentioned actuating means.

11. In an artificial fish lure of the class described, a buoyant supporting body portion, a laterally oscillatable head member adapted to be removably secured to the body portion in spaced enclosing relation to denote the head of the kind of fish bait to be represented by the fish lure, a body member removably secured to the body portion directly behind the head member to denote the body of the fish to be represented by the fish lure, fish impaling means on the supporting body portion partly concealed by the body member when said member is placed in position on the body portion.

12. In an artificial lure of the class described, a buoyant supporting body, a head member pivoted to the upper forward portion of the supporting body in spaced enclosing relation, means for detaching said head member from said supporting body, and a body member removably secured to supporting body comprising means for preventing detachment of the head member from said supporting body until the body member has been removed.

WILLIAM K. PORTER.